United States Patent [19]

Barie, Jr. et al.

[11] 4,132,697

[45] * Jan. 2, 1979

[54] POLYEPOXY RESIN-DIARYL DIANHYDRIDE LAMINATING RESINS AND LAMINATES

[75] Inventors: Walter P. Barie, Jr., Shaler Township, Allegheny County; Norman W. Franke, Penn Hills Township, Allegheny County, both of Pa.

[73] Assignee: Gulf Research & Development Company, Pittsburgh, Pa.

[*] Notice: The portion of the term of this patent subsequent to Dec. 7, 1993, has been disclaimed.

[21] Appl. No.: 694,848

[22] Filed: Jun. 10, 1976

Related U.S. Application Data

[60] Continuation of Ser. No. 531,186, Dec. 9, 1974, Pat. No. 3,996,105, which is a division of Ser. No. 310,412, Nov. 29, 1972, Pat. No. 3,914,512.

[51] Int. Cl.$^2$ .............................................. C08K 5/07
[52] U.S. Cl. ...................... 260/32.8 EP; 260/31.2 R; 260/33.6 EP; 260/33.8 EP
[58] Field of Search ................ 260/32.8 EP, 33.6 EP, 260/31.2 R, 47 EP, 47 EC, 47 EA, 47 EN

[56] References Cited

U.S. PATENT DOCUMENTS 3,996,185   12/1976   Barie et al. .................... 260/32.8 EP Primary Examiner—J. Ziegler

[57] ABSTRACT

A stable diaryl dianhydride-epoxy resin solution for preparing handleable, formable resin-impregnated reinforcing material and fully cured laminates. A non-viscous solution of 3,4,3',4'-benzophenone tetracarboxylic dianhydride and the reaction product of epichlorohydrin and bisphenol A is obtained in acetone.

4 Claims, No Drawings

POLYEPOXY RESIN-DIARYL DIANHYDRIDE LAMINATING RESINS AND LAMINATES

This is a continuation, of application Ser. No. 531,186 filed Dec. 9, 1974, now U.S. Pat. No. 3,996,135, which is a division of Ser. No. 310,412 filed Nov. 29, 1972, now U.S. Pat. No. 3,914,512.

This invention relates to laminates, both the handleable, formable resin-impregnated reinforcing material and the fully cured laminates, of an epoxy resin and a diaryl dianhydride and to a method of making the impregnating solution and the laminates. The fully cured laminates possess excellent chemical, thermal and physical properties.

The excellent properties obtainable from a copolymer of an epoxy resin and a diaryl hardener, preferably including a monoanhydride hardener, have been described by us in U.S. Pat. No. 3,324,081 for use as potting resins in encapsulation and the like. We at one time believed that it was not possible to prepare a fiber glass laminate of this resin combination having these excellent chamical, thermal and physical properties and were unsuccessful in our efforts to prepare the material. The diaryl dianhydrides are solids at room temperature (used herein to mean about 20° C. to about 25° C.). They are insoluble in the liquid epoxy resins and cannot be dissolved without first finely powdering the diaryl dianhydride and then heating and mixing the epoxy resin-dianhydride mixture to an elevated temperature as described in our patent. But due to the high mutual reactivity of the epoxy resin and the dianhydride at the solubilizing temperature, the dianhydride-epoxy resin mixture will dissolve and react concurrently to form a partially cured, highly viscous solution which cannot be used in laminating because it is too viscous to impregnate or wet the fiber glass.

It is well known in the art that a fiber glass impregnating resin must be sufficiently fluid to thoroughly wet and impregnate the fiber glass in order to make a satisfactory resin-fiber glass laminate. Discontinuities and voids in the resin phase of the fully cured laminate substantially detract from the properties of the laminate. When a resin formulation is too viscous, it is frequently possible to reduce its viscosity with a suitable solvent to improve its flow and wetting capabilities and thereby improve its impregnating potential. Also when the various constituents of a resin formulation are not mutually soluble, it may also be necessary to use a suitable solvent in order to obtain a solution with concurrent viscosity adjustment. Whether used to obtain solution or to adjust its viscosity the usual volatile nonreactive solvents will vaporize when the impregnated fiber glass laminate is heat cured and tend to introduce property destroying voids and discontinuities into the cured laminate if the solvent is not first volatilized off prior to lamination and curing.

The diaryl dianhydrides exhibit significant solubility in only a few solvents, primarily dimethylformamide and dimethylacetamide. For example, the solubility of 3,4,3'4'-benzophenone tetracarboxylic dianhydride in dimetylformamide is 21.0 g./100 cc. at 25° C. and in dimethylacetamide 24.2 g./100 cc. at 25° C. On the other hand the diaryl dianhydrides are so slightly soluble in the liquids which are regarded as conventional solvents including water, paraffinic hydrocarbons, chlorinated hydrocarbons, ketones and the like that they are regarded as insoluble in these liquids. For example, only 2.5 g of 3,4,3'4'-benzophenone tetracarboxylic dianhydride will dissolve in 100 cc. of acetone at 25° C. This is exemplified in U.S. Pat. No. 3,297,727 in which a ketone such as acetone is used to dissolve impurities from 3,4,3'4'-benzophenone tetracarboxylic dianhydride to capitalize on the relative insolubility of the dianhydride in the ketone.

We have found that an adequate impregnating solution can be obtained by using a suitable amount of dimethylformamide to dissolve the diaryl dianhydride and the epoxy resin. When the impregnated laminate is heated to cure the resin mixture, the solvent will volatilize and form extensive property destroying voids and bubbles in the laminate. On the other hand if the lamina are first heated in an effort to volatilize off the dimethylformamide solvent prior to the formation of the laminate, a suitable, cured laminate is still not obtainable. This latter failure is due to the inability to remove all of the dimethylformamide and the overthickening or polymerization of the resin mixture in the effort to remove the solvent resulting in an inadequate laminate having poor interlaminar adhesion with voids and bubbles.

Surprisingly, we have discovered a process for dissolving a diaryl dianhydride-epoxy resin mixture in a non-solvent for the diaryl dianhydride to produce a clear solution which is suitable for impregnating a fibrous reinforcing material such as fiber glass. The impregnating solution is stable at room temperature for long periods of time, measured in months, with no precipitation or significant increase in viscosity over this period of time. It will readily wet and completely impregnate one or more layers of the reinforcing material. The solvent can be readily vaporized from the impregnated reinforcing material to form a prepreg without inducing over polymerization of the resin mixture. The prepreg can then be associated in layers and be fully cured in a heated press mold to form the laminate. The resulting fully cured laminate possesses exceptional chemical, thermal and physical properties. If properly prepared, it will contain no significant property destroying voids, bubbles or other discontinuities in the resin phase.

The expression "prepreg" as used herein as well as used by workers in the fiber reinforced laminate art refers to impregnated reinforcing material which has been obtained by impregnating reinforcing material with a resin mixture and increasing the viscosity of the impregnated resin so that it is sufficiently non-tacky that it can be readily handled. The most universally used handleable, resin-impregnated, reinforcing material is glass fiber reinforced prepreg.

The expression epoxy resin and polyepoxide are used interchangeably herein to refer to the broad class of initial epoxide containing reactants useful for preparing the laminate. The epoxy resin can be a single compound or a mixture of compounds containing the alpha-epoxy group and can be monomeric or polymeric and should be nonplasticizing in the formulation used. Each epoxy group can be located terminally, internally, or on a cyclic structure that is capable of being used in preparing a thermoset material. The expressions are used with reference to the thermoplastic or uncured state and do not refer to a thermoset or cured material. When the epoxy resin is a single compound, it must contain at least two epoxy or oxirane groups per molecule. However, with epoxy resins or polyepoxides in which a variety of molecular species are present such as in the reaction product of epichlorohydrin and bisphenol A, the number of epoxy groups will vary from molecular species to molecular species such that the average number of epoxy groups per molecule is specified.

This average number of epoxy groups per molecule is also designated the epoxy equivalent value. When a mixture of compounds is involved, the epoxy equivalent value must be greater than one and preferably at least about two but will generally not be a whole integer. The epoxy equivalent value is obtained by dividing the average molecular weight of the epoxy resin by its epoxide equivalent weight (grams of epoxy resin containing one gram equivalent of epoxide). The epoxy resin can be aliphatic, cycloaliphatic, aromatic, heterocyclic, mixtures of these, saturated or unsaturated, and can include noninterfering groups such as halogen, alkoxy, ether and the like.

This broad class of epoxy resins which is useful in forming the epoxy containing polymer is exemplified by reference to several of the better known types. Glycidyl group epoxy resins are an important type of epoxy resin. This includes the glycidyl ethers, the glycidyl esters, the glycidyl amines, the thioglycidyl resins, the silicon glycidyl resins and the like. The glycidyl ethers include the glycidyl ethers of mononuclear polyhydric phenols, polynuclear polyhydric phenols, and the like. They may be single compounds or more commonly are a mixture of compounds, some of which are polymeric in nature.

The glycidyl ethers of polyhydric phenols include the glycidyl ethers of bisphenol A; resorcinol; hydroquinone; catechol; pyrogallol; phloroglucinol; their methyl derivatives; and the like as well as the glycidyl ethers of polynuclear phenols such as 2,2-bis(4-hydroxyphenyl)propane; bis(4-hydroxyphenyl)methane; 2,2-bis(4-hydroxyphenyl)isobutane; 2,2-bis(2-hydroxynaphthyl)-pentane; 1,5-dihydroxynaphthalene; 4,4'-dihydroxybiphenyl; 2,3',4-tri(epoxytripropoxy)biphenyl; dihydroxyfluoroanthrene; dihydroxydinaphthylmethane and the like and glycidyl ethers of the novolac resins, such as bisphenol F, which are the reaction product of formaldehyde with phenol and substituted phenols.

The epoxy resins also include epoxidized cycloaliphatic compounds such as vinylcyclohexene dioxide; limonene dioxide; dicyclopentadiene dioxide; 3,4-epoxy-6-methylcyclohexylmethyl-4-epoxy-6-methylcyclohexane carboxylate; and the like, and also include epoxidized butadiene, epoxidized polybutadiene, and the like. They further include epoxy resins obtained from chloroacetyl compounds such as 4,4-bis(1,2-epoxyethyl)phenyl ether; 1,3,5(1,2-epoxyethyl)benzene; 1,5(1,2-epoxyethyl)naphthalene; 4,4'-bis(1,2-epoxyethyl)biphenyl; and the like.

We find that the commercially available glycidyl ethers of bisphenol A, the glycidyl ethers of the novolac resins and the cycloaliphatic polyepoxides are highly useful in making the laminates having particularly desirable properties. Suitable glycidyl ethers of bisphenol A are available in the ERL series of Union Carbide Plastics Company, the Epon resins of Shell Chemical Company, and the D.E.R. series of Dow Chemical Company. Suitable glycidyl ethers of the novolac resins include D.E.N. 431 and D.E.N. 438 of Dow Chemical Company and Shell Chemical Company's Epon 152 and Epon 154. Suitable cycloaliphatic polyepoxides include ERL-4201 and ERL-4221 of Union Carbide Plastics Company. Other recommended polyepoxides are the nonplasticizing epoxy resins set out in Appendix 4-1 of HANDBOOK OF EPOXY RESINS by H. Lee and K. Neville, McGraw-Hill Book Company, 1967.

The epoxy resins used in the composition of this invention are cured with diaryl dianhydrides consisting of two mononuclear aryl groups joined together through a carbon atom having an anhydride function on each aryl group and more completely described in the following structural formula:

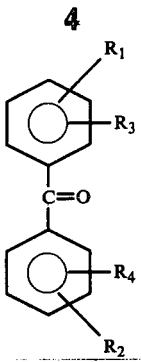

where $R_1$ and $R_2$ are anhydride groups; and where $R_3$ and $R_4$ are monovalent radicals selected from hydrogen, an alkyl group having between one and five carbon atoms, and a halogen.

The most preferred diaryl dianhydride is 3,4,3',4'-benzophenone tetracarboxylic dianhydide. Other diaryl dianhydrides which are defined by the above structural formula are disclosed in U.S. Pat. No. 3,324,081 at column 3, line 61 through column 4, line 55, which diaryl dianhydrides are incorporated herein by reference and made a part of this specification. Although the diaryl dianhydride can be used alone as the anhydride hardener component, we prefer to use a mixed anhydride comprising both the diaryl dianhydride and also a monoanhydride component. The diaryl dianhydride can comprise from about 15 weight percent to 100 percent of the anhydride hardener and preferably about 25 percent to about 50 percent of the total anhydride with the remainder being the monoanhydride. Any monoanhydride will copolymerize in the reaction and can be used in combination with the diaryl dianhydride. Preferably, however, the monoanhydride is selected to result in suitable physical properties in the resulting fully cured laminate. It is desired that the fully cured resin possess suitably high values in those properties particularly as determined by flexural strength test (ASTM 790-66), tensile strength test (ASTM 638-68) and heat distortion test (ASTM 648-61) as well as possess excellent solvent, chemical, and high temperature resistance. Monoanhydrides which tend to impart a plasticizing function into the cured resin are the least preferred. Desirable nonplasticizing monoanhydrides include maleic anhydride; succinic anhydride; and the one to six carbon alkyl, the chloro, the phenyl, the benzyl and the mono and dimethylbenzyl derivatives of maleic anhydride such as citraconic anhydride; itaconic anhydride; chloromaleic anhydride; methyl succinic anhydride; propylsuccinic anhydride; hexylsuccinic anhydride; phenylmaleic anhydride; α,α-dimethylbenzylsuccinic anhydride; and the like. Also desirable monoanhydrides include phthalic anhydride, tetrahydrophthalic anhydride, hexahydrophthalic anhydride, and their chloro, methyl and cyano derivatives, and the like, such as methyltrihydrophthalic anhydride; 1,2-dicarboxylic-4-chlorocyclohexane anhydride; 1,2-dicarboxylic-4-cyanocyclohexane anhydride; and the like. Further desirable monoanhydrides include 1,2-dicarboxyliccyclopentane; 1,2-dicarboxyliccycloheptane; and the three-ringed anhydrides formed by the Diels-Alder condensation of maleic anhydride with cyclopentene, furan, or their methyl derivatives, such as bicyclo(2.2.1)heptene-2,3-dicarboxylic anhydride (Nadic anhydride); a mixture of methylbicyclo(2.2.1)heptene-2,3-dicarboxylic anhydride isomers (Nadic methyl anhydride); 7-oxabicyclo(2.2.1)heptene-2,3-dicarboxylic anhydride; and the like.

In making our invention we have unexpectedly discovered procedures for dissolving the diaryl dianhydride-epoxy resin mixture using as a solvent a material which is not a solvent for the diaryl dianhydride per se. The preferred solvent is acetone. Other suitable solvents include other low boiling compounds such as the lower alkyl ketones having up to five carbon atoms, such as methyl ethyl ketone, methyl isopropyl ketone, methyl isobutyl ketone, and the like; lower alkyl carboxylic acid esters having up to five carbon atoms such as methyl acetate, ethyl acetate, isopropyl acetate, and the like; chlorinated hydrocarbons having one or two carbon atoms such as methylene chloride, chloroform, carbon tetrachloride, trichloroethylene, 1,1,1-trichloroethane; 1,1,2-trichloroethane; and the like, aromatic hydrocarbons having six or seven carbon atoms, such as benzene and toluene, and mixtures of any two or more of these low boiling compounds.

The low boiling solvent desirably possesses a boiling point no higher than about 110° C. It is used in an amount sufficient to dissolve the anhydride-epoxy resin mixture and to provide a suitable fluidity or viscosity for impregnating the fibrous material. A viscosity under 10,000 centipoises is the preferred solution viscosity for impregnation. Generally, the desired solution viscosity is obtained when the low boiling solvent comprises from about 20 to about 80 weight percent of the anhydride-epoxy resin-solvent mixture and preferably from about 30 to about 70 weight percent. When the solvent is acetone, the anhydride-epoxide impregnating solution can be used at room temperature. However, when other solvents are used, precipitation of solute may occur at room temperature. High quality precipitationfree impregnation is obtained with these latter solutions if they are used when they are above their precipitation temperature.

In preparing the cured laminate it may be necessary to utilize an anhydride-accelerator in the anhydride-epoxy resin formulation. When the anhydride hardener contains no monoanhydride, we have found that an anhydride-accelerator is of no particular benefit in obtaining a suitable cured laminate. However, curing is benefited by an anhydride-accelerator when some monoanhydride is present in the anhydride hardener. If the monoanhydride comprises about 50 weight percent or more of the anhydride hardener component, a suitable anhydride-accelerator is essential to obtain a useful laminate. This class of accelerators is well known and includes the tertiary amines such as benzyldimethylamine, benzyldiethylamine; diethylethanolamine, dimethylethanolamine; triethylamine; tripropylamine; tributylamine; pyridine, 2-picoline; 4-picoline; 2,6-lutidine; alpha-methylbenzyldimethylamine; dimethylaminopropylamine; dimethylaminomethyl phenol; tris(dimethylaminomethyl)phenol; and the like; as well as tin octanoate, $BF_3$.monoethylamine complex, and the like. The accelerator can be used in the range of about 0.5 to about 5.0 parts per hundred parts of resin (phr.) and preferably about 1.0 to about 3.0 phr.

If the diaryl dianhydrides defined above are used alone as the cross-linking agent for the epoxy resin, then in order to obtain a fully cured laminate with the best physical properties, it has been found that the ratio of the chemical anhydride equivalents of diaryl dianhydride to the chemical epoxide equivalents of the epoxy resin (the A/E ratio) must be maintained between 0.4 and 0.65 with a preferred ratio between 0.58 and 0.63. At ratios of anhydride to epoxide equivalents less than 0.4, the physical properties are not optimum, while at ratios greater than 0.65, the hardened compositions are not clear but grainy and darker in appearance. This is apparently because the diaryl dianhydrides of this invention react so quickly that if amounts greater than specified above are employed, a portion will not have time to react before it is encapsulated in the hardened epoxy resin around it.

The diaryl dianhydrides of this invention are solids at ordinary temperatures and consequently are difficultly soluble in the epoxy resins. The diaryl dianhydrides will go into solution in the epoxy resins more easily at an elevated temperature but the cross-linking activity of these diaryl dianhydrides substantially increases as the temperature increases such that the resulting solution cools to a viscous mixture or gel which cannot be used for impregnating fiber glass. We have surprisingly discovered after the anhydride hardener-epoxy resin mixture containing the powdered diaryl dianhydride is heated and solution of the diaryl dianhydride in the epoxy resin is obtained, that this solution can then be dissolved in a low boiling organic liquid which is not a solvent for the diaryl dianhydride.

For example, the anhydride hardener-epoxy resin mixture is heated to 150°–160° C. with stirring until solution is obtained. This solution is then refluxed with acetone, preferably after partial cooling of the solution, to form a solution in acetone. This resulting solution is stable for many months at room temperature. Prior to the impregnation of fiber glass lamina with the resin mixture in acetone solution, a suitable anhydride accelerator is added to the solution. The acetone solvent is vaporized from the impregnated lamina at an elevated temperature, for example at about 80° C., and the resin mixture in the lamina concurrently thickens from the easily flowing, sticky material to a viscous handleable lamina or prepreg. The thickening of the resin to form the prepreg results from the combined effect of the evaporation of the low viscosity solvent and a partial cross-linking of the epoxy resin by the anhydride hardener. The overall properties of the prepreg are a function of the time and temperature of the solvent removal step, the nature of the anhydride and epoxy resin constituents and indirectly a function of the volatility of the solvent. The solvent is preferably substantially completely removed in this step to prevent solvent bubbling in the final cure. Also the resin mixture is partially cross-linked to form a handleable prepreg in the solvent removal step but is not cross-linked to a degree that would prevent adequate flow and interbonding with other lamina in the final cure of the laminate under heat and pressure. Therefore, the solvent must be selected for any specific anhydride-epoxy resin formulation not only for its solventability but it also must be selected so that it can be substantially completely removed at the conditions of the prepreg formation stage without overcuring the prepreg in the solvent's removal. We have found that acetone is the preferred general solvent in this invention.

More specifically, in this procedure the anhydride component and epoxy resin are heated to a temperature between about 140° C. and about 190° C. and preferably between about 150° C. and about 175° C. until solution is obtained. Although the solvent such as acetone can be added to the hot solution with the mixture cooled by the refluxing solvent, we prefer to reduce the vigor of the solvent boil by first externally cooling the resin mixture to a temperature between about 100° C. and about 140° C. before the low boiling solvent is added. The resin mixture is fully dissolved by the low boiling solvent such as acetone as the mixture gradually cools to room temperature.

In this procedure when acetone or methyl ethyl ketone is used as the solvent, the resulting acetone or methyl ethyl ketone solution will generally exhibit some precipitation at room temperature if the resin mixture is cooled, either externally or by addition of solvent, immediately after the resin mixture becomes homogeneous. We have found that if the resin mixture is heated for an additional sufficient period of time, generally between about two and about ten minutes within the broad range of about 140° C. to about 190° C., prior to cooling and/or addition of the solvent, the subsequent precipitation at room temperature can be avoided. This additional heating can be carried out to obtain the desired result by an amount of additional heating which is less than would cause the undesired gelation of the resin.

This novel diaryl dianhydride-epoxy resin impregnated prepreg can also be formed by an alternative procedure which results in an impregnating solution having a storage stability up to one or two weeks. In this procedure, which is the preferred procedure if a storage stability greater than one to two weeks is not required, the epoxy resin, the anhydride hardener, the anhydride accelerator and the low-boiling solvent are added together and heated with mixing, preferably at the reflux temperature of the solvent, until solution is obtained. The impregnating solution of this procedure is intended for relatively immediate use in the formation of the prepreg by impregnation of the fiber glass lamina and evaporation of the solvent as described in connection with the first described method.

In either procedure the low boiling solvent is evaporated from the impregnated lamina at a temperature within the range of about 50° C. and about 120° C. for a sufficient time for substantially complete removal of the solvent without causing an overcure of the prepreg. The optimum time and temperature relationship for any specific solvent and resin mixture formulation is readily determined by a few experiments. We find that between about 60° C. and about 80° C. are optimum for acetone removal. If the solvent has been removed under conditions that result in insufficient cross-linking of the epoxy resin by the anhydride hardener, then it is a simple matter to continue the mild heating following the solvent removal until a satisfactory moldable, handleable prepreg is obtained.

Since the diaryl dianhydrides are so difficultly soluble in the epoxy resin, solubility is enhanced by dispersing the diaryl dianhydride more completely in the epoxy resin as a fine powder. The anhydride component also goes into solution more readily when it contains monoanhydride. When the diaryl dianhydride is used exclusively in the anhydride hardener component, the maximum amount of the diaryl dianhydride component that can be satisfactorily incorporated into the epoxy resin is an amount which will form an A/E ratio of about 0.65. However, studies have shown that an A/E ratio of about 0.85 for anhydride hardened epoxy resins in general produces optimum properties in the final product. If the monoanhydride is used alone as the anhydride hardener, it produces a final product having an A/E ratio of 0.85 that is inferior in properties to that produced by the diaryl dianhydride used alone at an A/E ratio of 0.65. However, as indicated, the use of the monoanhydride enhances solubility of the anhydride component containing the diaryl dianhydride whether made by either procedure and also makes possible a higher A/E ratio depending on the proportion of the monoanhydride relative to the diaryl dianhydride. We have discovered that by using a mixed anhydride an A/E ratio as high as 1.0 or higher can be achieved. We have further discovered that the tendency to degrade the properties of the final product by using the monoanhydride with more costly diaryl dianhydride is substantially compensated for by the improvement in properties resulting from the increase in the A/E ratio in the direction of the optimum value of about 0.85. The overall effect of the monoanhydride is therefore advantageous. The optimum anhydride hardener composition is about 50 to about 75 weight percent monoanhydride with the remainder constituting diaryl dianhydride. Within this range the A/E ratio can be between about 0.4 to about 1.0 and more preferably between about 0.65 and about 0.85 and most preferably about 0.85.

The final laminate is made by stacking the individual laminas or prepregs to a desired thickness, generally to form a laminate of six to 12 lamina. The laminate is cured in a heated pressure mold under conditions of temperature and pressure that will cause the resin mixture to flow and completely wet the fibers and fully integrate with adjacent layers prior to gelation. A unitary, substantially bubble-free and defect-free fully cured laminate is obtained when the various steps have been carried out under optimized conditions.

The curing conditions are not critical provided that a substantially fully cured integral and sound laminate is the result. The material can be conveniently cured at about 80° C. to about 200° C., preferably from about 90° C. to about 165° C. for about 10 minutes to about four hours or more, preferably from about 15 minutes to about two hours at a pressure of about 50 p.s.i. to about 5,000 p.s.i., and preferably a pressure of about 150 p.s.i. to about 500 p.s.i. This can be followed by a post cure at a temperature between about 120° C. to about 220° C., preferably between about 150° C. to about 200° C. for up to 24 hours or longer. Post curing refers to the heating of the fully formed laminate at atmospheric pressure to ensure substantially complete cross-linking by substantially all of the available active groups. It is also possible and sometimes preferred to utilize a stepwise cure, that is, heating at a specified temperature and pressure for a period of time followed by treatment at a second temperature and pressure for a succeeding period of time and then the pose cure.

The fibrous reinforcing material can be iin the form of a mat, wool, paper, woven fabric and the like and can be either of a synthetic fiber such as nylon, polyester, graphite, boron, glass, steel and the like; or a natural fiber such as asbestos, and the like; for example polyester wool, asbestos paper, fiber glass cloth, wound fiber glass filament, and the like.

Woven fiber glass in various grades and texture is well known and commercially available for producing resin-fiber glass compositions. A finish is generally applied to the fiber glass filaments by the manufacturer. It is preferred that the fiber glass filaments comprising the woven product have a coating or finish which is reactive under the curing conditions with at least one of the resin-forming components. The silane finishes are preferred because they are chemically bonded to the glass filaments and have free reactive groups available for reaction with the resin components. The final product will comprise from about 50 to about 90 weight percent of the fibrous material, preferably from about 60 to about 80 weight percent.

As pointed out, the advantages of the diaryl dianhydride cured epoxy resin laminate include excellent physical properties such as flexural strength and tensile strength, which can only result from the use of nonplasticizing epoxy resins and monoanhydrides. Since a plasticizer including a reactive plasticizing material also called an internal plasticizer, increases the softness, flexibility and distensibility of the fully cured product, a plasticizing material would tend to defeat the particular advantages inherent in the preferred laminate. Therefore, the plasticizing epoxy resins, such as epoxidized animal or vegetable oils, and the plasticizing monoanhydride, such as dodecenyl succinic anhydride, are not used in preparing the laminates possessing the superior physical properties.

The following examples are set out to illustrate the invention and to provide a better understanding of its details and advantages.

In the following examples Epon 828 is the reaction product of epichlorohydrin and bisphenol A having an epoxide equivalent value of 175-210 and a viscosity at 25° C. of 10,000-20,000 cps. and sold by Shell Chemical Company. D.E.N. 438 is a Dow Chemical Company epoxy resin synthesized by the reaction of epichlorohydrin and the product obtained by the reaction of phenol and formaldehyde in an acid solution having an epoxide equivalent value of 176-181 and a viscosity of 35,000-70,000 cps. at 52° C. NMA, Nadic methyl anhydride, is a mixture of methyl bicyclo(2.2.1)heptane-2,3-dicarboxylic anhydride isomers sold by Allied Chemical Corporation. BTDA, 3,3',4,4'-benzophenone tetracarboxylic dianhydride, is sold by Gulf Oil Chemicals Company. In the examples 7-inch by 7-inch strips of 181 fiber glass cloth having Linde A1100 silane finish were used. The resulting 7-inch by 7-inch laminates were cut to the proper dimension as required for the indicated ASTM test. The flexural strengths were determined at either 73° F. or 500° F., as indicated in the following examples.

EXAMPLE 1

A diaryl dianhydride-monoanhydride-epoxy resin solution was made by the procedure of U.S. Pat. No. 3,324,081. A solution of 100.0 grams of Epon 828 and 54.6 grams of NMA was made in a one liter resin kettle equipped with powder addition apparatus. The solution was heated to 150-160° C. and 23.4 grams of finely powdered BTDA, which constituted 30 weight percent of the total anydride portion of the final composition, were added. A homogeneous solution was obtained in about 5-10 minutes. The mixture was cooled to 80° C. and two parts of benzyldimethylamine per hundred parts of epoxy resin were added, followed by final cooling to room temperature. The viscosity of this solution was immediately measured at 23° C. and found to be 173,200 cps. and was again measured after three hours at 23° C. and found to be 204,000 cps. A second solution containing Epon 828, NMA and two parts benzyldimethylamine per hundred parts of epoxy resin also at an A/E ratio of 0.85, was made at room temperature and found to have an initial viscosity at 23° C. of 2,910 cps. and a viscosity after three hours at 23° C. of 5,050 cps. It was impossible to impregnate fiber glass cloth with the BTDA containing mixture. In contrast with this, the low viscosity BTDA-free solution readily wet fiber glass cloth.

EXAMPLE 2

An acetone solution of the same diaryl dianhydridemonoanhydride-epoxy resin formulation described in Example 1 was made by our novel process. A solution of 150.0 grams of Epon 828 and 81.9 grams of NMA was heated to 150° C. in the resin kettle and 35.1 grams of the finely powdered BTDA were added and heating was continued at 170° C. until a homogenous solution was obtained. This solution was heated for 5-6 minutes at 175-180° C. after homogeneity was obtained in order to forestall subsequent precipitation of solids upon cooling to room temperature. The solution was then cooled to 130° C. and 420 cc. of acetone was added to the resin kettle which was also equipped with a reflux condenser. The solution was allowed to cool under reflux. The final acetone solution contained 45 percent resin components having an A/E ratio of 0.85 in which the BTDA was 30 weight percent of the anhydride portion. The viscosity of this clear solution remained substantially constant for many months since no accelerator had been added. After seven months, the solution was still clear and the viscosity was 10 cps. at 25° C.

EXAMPLE 3

A series of diaryl dianhydride-monoanhydride-epoxy resin solutions in 45 weight per acetone were made by the procedure of Example 2. BTDA was used as the diaryl dianhydride, NMA or maleic anhydride (MA) as the monoanhydride and Epon 828 was the epoxy resin. Two parts of benzyldimethylamine per hundred parts of the epoxy resin were added in the formulations containing less than 70 weight percent BTDA in the anhydride portion. A series of 7-inch by 7-inch strips of fiber glass cloth were dip-impregnated with the solutions. The acetone was removed from the impregnated glass strips in a circulating air oven at 80° C. between three and eight minutes depending on the resin formulation. These prepreg strips were cured into 12-ply laminates at 165° C. and 200 p.s.i. for 15 minutes and post cured at 150° C. for 24 hours. The heat aging strengths for various amounts of BTDA in the hardener component, indicated as weight percent, are set out in Table I.

Table I

| Sample | Mono-anhydride | BTDA, Wt. % | A/E | Resin, Wt. % | Flexural Strength, psi × $10^3$ ||||||
|---|---|---|---|---|---|---|---|---|---|---|
| | | | | | Initial || Heat aging at 500° F. for ||||
| | | | | | | | 500 hours || 1,000 hours ||
| | | | | | 73° F. | 500° F. | 73° F. | 500° F. | 73° F. | 500° F. |
| 1 | NMA | 0 | 0.85 | 21.8 | 83.4 | — | 23.4 | 11.5 | Fail | Fail |
| 2 | None | 100 | 0.50 | 26.9 | 75.9 | 26.9 | 76.4 | 55.5 | 34.8 | 41.3 |
| 3 | NMA | 10 | 0.85 | 20.2 | 81.5 | 16.2 | 13.7 | 9.8 | 1.6 | 0.5 |
| 4 | NMA | 20 | 0.85 | 22.7 | 64.0 | 11.7 | 8.8 | 5.7 | 3.2 | 1.0 |
| 5 | NMA | 30 | 0.85 | 30.8 | 81.0 | — | 49.6 | 39.6 | 43.0 | 37.9 |
| 6 | NMA | 50 | 0.85 | 25.7 | 69.1 | 14.6 | 58.4 | 37.2 | 36.3 | 21.5 |
| 7 | NMA | 70 | 0.85 | 20.6 | 58.0 | 21.7 | 19.9 | 22.3 | 12.1 | 8.0 |
| 8 | NMA | 90 | 0.65 | 23.4 | 71.4 | 30.0 | 56.4 | 40.5 | 28.0 | 22.9 |
| 9 | MA | 10 | 0.85 | 21.0 | 75.1 | 13.8 | 9.0 | 7.7 | 3.6 | 1.1 |
| 10 | MA | 20 | 0.85 | 22.5 | 79.0 | 14.2 | 52.2 | 36.9 | 15.0 | 8.2 |
| 11 | MA | 30 | 0.85 | 26.8 | 79.0 | — | 48.2 | 23.8 | 32.2 | 33.6 |
| 12 | MA | 40 | 0.85 | 27.8 | 79.5 | — | 44.7 | 27.5 | 43.0 | 33.7 |
| 13 | MA | 50 | 0.85 | 22.9 | 63.0 | 11.2 | 54.0 | 30.6 | 38.8 | 31.3 |

Table I-continued

| | | | | | Flexural Strength, psi × 10³ | | | | | |
|---|---|---|---|---|---|---|---|---|---|---|
| | | | | | Initial | | Heat aging at 500° F. for | | | |
| | | | | | | | 500 hours | | 1,000 hours | |
| Sample | Mono-anhydride | BTDA, Wt. % | A/E | Resin, Wt. % | 73° F. | 500° F. | 73° F. | 500° F. | 73° F. | 500° F. |
| 14 | MA | 83 | 0.65 | 26.2 | 71.0 | 19.4 | 67.4 | 50.2 | 46.6 | 37.8 |
| 15 | MA | 94.5 | 0.55 | 21.6 | 71.3 | 32.0 | 25.4 | 24.4 | 17.4 | 9.7 |

No comparison product using maleic anhydride as the sole anhydride reactant could be made because of the over-reactivity of the formulation. The laminates which failed broke apart into the individual fiber glass strips and exhibited severe degradation of the resin.

EXAMPLE 4

A series of diaryl dianhydride-epoxy resin solutions in dimethylformamide were formed at room temperature using BTDA, Epon 828 and optionally maleic anydride. No anhydride accelerator was used in formulations in which BTDA comprised more than 50 weight percent of the anhydride hardener component. After dip-impregnating fiber glass strips in these solutions, prepregs were made by vaporization of the dimethylformamide from the strips in the circulating air oven at 80° C. for six minutes. These prepreg strips were formed into 12-ply laminates which were cured for 15 minutes at 30 p.s.i. The curing temperature was 150° C. when maleic anhydride was present and 200° C. when maleic anhydride was not present. The post cure was at 200° C. for 24 hours. The heat stability characteristics of these dimethylformamide-dissolved formulations were compared with acetone-dissolved formulations from Table I as set forth in Table II.

Table II

| | | | | | | | Flexural Strength, psi × 10³ | | | |
|---|---|---|---|---|---|---|---|---|---|---|
| | | | | | | | Heat Aging at 500° F. for | | | |
| | | | | | | Initial | 500 hours | | 1,000 hours | |
| Sample | Mono-anhydride | BTDA, Wt. % | A/E | Solvent | Resin, Wt. % | 73° F. | 73° F. | 500° F. | 73° F. | 500° F. |
| 16 | None | 100 | 0.6 | DMF | 19.6 | 54.2 | 8.1 | 10.1 | 5.8 | 4.9 |
| 17 | MA | 94.5 | 0.55 | DMF | 20.1 | 32.4 | 0.4 | 0.5 | Fail | Fail |
| 18 | MA | 83 | 0.65 | DMF | 25.5 | 65.7 | 12.1 | 10.3 | 7.1 | 6.5 |
| 19 | MA | 62 | 0.75 | DMF | 20.2 | 48.5 | 1.3 | 2.1 | Fail | Fail |
| 2 | None | 100 | 0.50 | Acetone | 26.9 | 75.9 | 76.4 | 55.5 | 34.8 | 41.3 |
| 15 | MA | 94.5 | 0.55 | Acetone | 21.6 | 71.3 | 25.4 | 24.4 | 17.4 | 9.7 |
| 14 | MA | 83 | 0.65 | Acetone | 26.2 | 71.0 | 67.4 | 50.2 | 46.6 | 37.8 |
| 13 | MA | 50 | 0.85 | Acetone | 22.9 | 63.0 | 54.0 | 30.6 | 38.8 | 31.3 |

The striking superiority in the heat resistance of laminates formed from an acetone solution of the resin formulation in contrast with the equivalent laminates formed from a dimethylformamide solution of the equivalent resin formulations is illustrated in Table II. The initial flexural strength of the laminate obtained from the acetone dissolved resin is substantially superior to the initial flexural strength of the laminate obtained from the dimethylformamide dissolved resin. This is primarily the result of the complete removal of the acetone prior to cure and the corresponding incomplete removal of the dimethylformamide prior to cure. The striking difference in heat stability is also, in part, a result of the difference in the removal of solvent. If the time-temperature relation is adjusted for substantially complete removal of dimethylformamide, the resin is converted to an unusable gel.

EXAMPLE 5

Methyl ethyl ketone, ethyl acetate, methylene chloride and toluene, each one of which exhibits only slight solubility for diaryl dianhydrides, were separately investigated to determine their suitability in our process. For each solvent a 50:50 weight percent solution of BTDA and NMA was made in Epon 828 at an A/E ratio of 0.85 and 150–160° C. as described in Example 2. The temperature was then reduced to 120–130° C. and sufficient solvent was added to form a solution containing 55 weight percent of the solvent. The solution cooled under reflux and after refluxing stopped, it was allowed to cool to room temperature. A moderate white precipitate has formed as room temperature was reached with each solvent. Precipitation was severe in each case after standing for 12 hours at room temperature. We determined that each solution was satisfactory for fiber glass impregnation if used after reflux had ceased and before it had cooled to the temperature at which precipitation began. The equivalent solution using acetone as the solvent showed no precipitation upon standing at room temperature for more than six months.

EXAMPLE 6

Example 5 was repeated using maleic anhydride instead of NMA as the monoanhydride and the same quantities, A/E ratio and procedures. The methyl ethyl ketone solution exhibited no precipitation upon cooling to room temperature and showed slight precipitation after standing for 12 hours. The solutions made from ethyl acetate, methylene chloride and toluene showed moderate precipitation on cooling to room temperature and severe precipitation after standing for 12 hours at room temperature and had to be used while still in solution at an elevated temperature as described in Example 5. An equivalent acetone solution was stable on standing at room temperature for over six months.

EXAMPLE 7

A series of acetone solutions were made by the method of Example 3 of a 1:1 weight ratio of BTDA:NMA in Epon 828 at an A/E ratio of 0.85 using two parts of benzyldimethylamine per hundred parts of epoxy resin. These solutions were made to contain from 45 to 60 weight percent of the resin formulation. Equivalent 12-ply laminates made from these solutions exhibited substantially identical flexural strengths and heat resistance.

EXAMPLE 8

In another series of experiments it was determined that the initial flexural strength of the laminate produced as described in Example 3 is substantially independent of whether an accelerator is used for the cure. However, it was determined in general that the heat stability of laminates having 50 weight percent or more monoanhydride in the anhydride hardener fraction is superior when an accelerator is used while the heat stability does not appear to be affected by the presence of an accelerator when the anhydride hardener is 100 percent BTDA.

Example 9

A series of 12-ply laminates were examined for hardness and were compared with an equivalent laminate made with NMA as the only anhydride component prepared as described in Example 3 using Epon 828, BTDA, Nadic methyl anhydride and maleic anhydride. Two parts of benzyldimethylamine per hundred parts of epoxy resin were used as an accelerator in the formulations containing 50 percent or more monoanhydride in the hardener component. The impregnating solution contained 55 percent acetone solvent which was removed at 80° C. for three minutes to form the prepreg. The laminates were cured at 165° C. and 225 p.s.i. for 15 minutes and post cured at 150° C. for 24 hours. The results are set out in Table III.

Table III

| No. | Mono-anhydride | BTDA, Wt. % | A/E | Rockwell M Hardness |
|---|---|---|---|---|
| 20 | NMA | 0 | 0.85 | 66 |
| 21 | None | 100 | 0.5 | 85 |
| 22 | NMA | 30 | 0.85 | 101 |
| 23 | NMA | 50 | 0.85 | 117 |
| 24 | MA | 30 | 0.85 | 107 |
| 25 | MA | 50 | 0.85 | 109 |

Epoxy-glass laminates typically exhibit a Rockwell M hardness in the range of 80–100.

Example 10

The laminates described in Example 9 were compared for chemical and solvent resistance. The results are set out in Table IV.

Table IV

| | | Weight Change, % | | | |
|---|---|---|---|---|---|
| Mono-anhydride | BTDA, Wt. % | After 3 days at 160° F. in | | | Boiling Acetone, 3 hours |
| | | 10% NaOH | 20% $H_2SO_4$ | $H_2O$ | |
| NMA | 0 | 9.38 | 4.77 | 4.1 | 3.3 |
| NMA | 30 | 4.50 | 0.15 | 0.70 | 0.09 |
| MA | 30 | 5.53 | 0.65 | 0.47 | 0.10 |
| NMA | 50 | 0.47 | 0.27 | 0.52 | 0.08 |
| MA | 50 | 0.10 | 0.16 | 0.42 | 0.09 |
| NMA | 90 | 8.73 | 4.26 | 1.65 | 0.72 |
| MA | 83 | 20.9 | 12.2 | 4.37 | 2.88 |
| none | 100 | 9.36 | 7.6 | 3.28 | 0.98 |

The A/E ratio was 0.85 when less than 83 percent BTDA was used, 0.5 when 100 percent BTDA was used and was 0.65 for th remainder.

Example 11

Another series of experiments were carried out to determine the effect of various chemicals and solvents on the flexural strength and tensile strength of the laminates prepared as described in Example 9. The results showing the effect of the treatment on flexural strength, determined at 73° F., are set out in Table V.

Table V

| | | Flexural Strength, psi × $10^3$ | | | | |
|---|---|---|---|---|---|---|
| Mono-anhydride | BTDA, Wt. % | Initial | 160° F. for three days | | | Boiling Acetone, 3 hours |
| | | | 10% NaOH | 20% $H_2SO_4$ | $H_2O$ | |
| NMA | 0 | 64.0 | 4.5 | 14.8 | 53.0 | 59.4 |
| NMA | 30 | 70.6 | 7.0 | 40.3 | 74.3 | 70.4 |
| MA | 30 | 75.1 | 4.2 | 53.9 | 75.9 | 76.9 |
| NMA | 50 | 75.0 | 7.8 | 43.0 | 73.7 | 71.9 |
| MA | 50 | 73.9 | 3.4 | 48.7 | 75.4 | 72.9 |
| none | 100 | 70.0 | 4.2 | 9.5 | 68.2 | 57.0 |

The results on tensile strength, also determined at 73° F., are set out in Table VI.

Table VI

| | | Tensile Strength, psi × $10^3$ | | | | |
|---|---|---|---|---|---|---|
| Mono-anhydride | BTDA, Wt. % | Initial | 160° F. for three days | | | Boiling Acetone, 3 hours |
| | | | 10% NaOH | 20% $H_2SO_4$ | $H_2O$ | |
| NMA | 0 | 45.0 | 1.2 | 18.7 | 42.7 | 43.6 |
| NMA | 30 | 47.6 | 8.3 | 19.8 | 43.6 | 46.7 |
| MA | 30 | 45.6 | 6.8 | 34.3 | 51.3 | 50.9 |
| NMA | 50 | 46.7 | 6.4 | 36.1 | 40.7 | 46.4 |
| MA | 50 | 49.8 | 0.7 | 32.4 | 43.4 | 43.7 |
| none | 100 | 44.1 | 5.1 | 11.1 | 42.0 | 46.1 |

Additional tests on these same laminates to determine the effect of the chemicals and solvents on the dielectric constant and dissipation factor resulted in initial results which were satisfactory with a reduction in these properties under chemical and solvent attack similar to the reduction in physical properties as indicated in Tables V and VI.

EXAMPLE 12

A series of laminates were made by the second method (Method No. 2) using Epon 828 or D.E.N. 438 as the epoxy resin, BTDA as the diaryl dianhydride and Nadic methyl anhydride or maleic anhydride as the monoanhydride and benzyldimethylamine as the accelerator. Sufficient acetone was used to form a solution containing about 55 weight percent acetone. In this method all components including the acetone solvent were added at room temperature to the one liter resin kettle fitted with a stirrer and reflux condenser. The mixture was heated to 56° C., the reflux temperature of acetone, and maintained at reflux until complete solution was obtained in about one to two hours as evidenced by a clear, non-cloudy solution. The solution, cooled to room temperature, was used for dip-impregnating fiber glass cloth strips. The prepregs were formed at 80° C. for six to eight minutes and 12-ply laminates were formed at a cure sequence of 90° C. at 500 p.s.i. for one hour, 165° C. at 500 p.s.i. for one hour and a post cure at 200° C. for 16 hours. The flexural strengths (determined at 73° C. and 500° C.) of these laminates and laminates made according to Example 2 (Method No. 1) were compared as set out in Table VII.

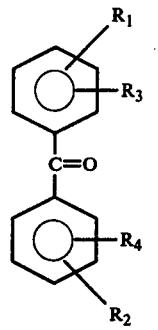

Table VII

| Epon 828 D.E.N. 438 | Mono-anhydride | BTDA % | BDMA phr. | A/E | Method No. | Initial at 73° F. | Initial at 500° F. | After Aging 500 hrs. at 500° F. 73° F. | After Aging 500 hrs. at 500° F. 500° F. | After Aging 1,000 hrs. at 500° F. 73° F. |
|---|---|---|---|---|---|---|---|---|---|---|
| 1/0 | NMA | 50 | 2.0 | 0.85 | 1 | 69.1 | 14.6 | 58.4 | 37.2 | 36.3 |
| 1/0 | NMA | 50 | 2.0 | 0.85 | 2 | 78.9 | 17.2 | 61.1 | 45.2 | 28.9 |
| 1/0 | MA | 50 | 2.0 | 0.85 | 1 | 63.0 | 11.2 | 54.0 | 30.6 | 38.0 |
| 1/0 | MA | 50 | 2.0 | 0.85 | 2 | 87.5 | 15.4 | 76.0 | 44.0 | 46.6 |
| 0/1 | NMA | 50 | 2.0 | 0.85 | 1 | 57.6 | 25.8 | 28.4 | 22.3 | — |
| 0/1 | NMA | 50 | 2.0 | 0.85 | 2 | 76.2 | 19.1 | 44.8 | 39.1 | 8.9 |
| 1/0 | none | 100 | 0 | 0.5 | 1 | 75.9 | 26.9 | 76.4 | 55.5 | 41.3 |
| 1/0 | none | 100 | 1.0 | 0.5 | 2 | 83.7 | 17.1 | 73.6 | 56.7 | 39.5 |

Since a diaryl dianhydride is primarily used in a resin formulation to impart improved high temperature properties to the resulting laminate, formulations which contain a diaryl dianhydride and have the desired improved high temperature properties are successful improvements even though their initial properties, prior to exposure to high temperatures, may be equivalent to or even somewhat inferior to other formulations using only a monoanhydride. Although the laminates described herein in general contained between about 20 and 30 percent resin due to variations inherent in the procedures used, we have found that there appeared to be no significant difference in properties attributable to the difference in resin content within this range. Small variations in resin solution viscosity appeared to be a significant source of the variation in resin pick-up by the fiber glass cloth in the dip impregnation. But since the resin content of the laminate is not narrowly critical to the desired properties, this variable is primarily adjustable to minimize product cost.

It is to be understood that the above disclosure is by way of specific example and that numerous modifications and variations are available to those of ordinary skill in the art without departing from the true spirit and scope of the invention.

We claim:
1. A method for making a liquid epoxy resin-diaryl dianhydride impregnant for binding fibrous reinforcing material which comprises
   (1) a nonplasticizing 1,2-epoxy resin which contains on the average more than one 1,2-epoxy group per molecule,
   (2) an anhydride hardener comprising
      from about 15 to about 100 weight percent of a diphenyl dianhydride having the structural formula where $R_1$ and $R_2$ are the anhydride group; and where $R_3$ and $R_4$ are monovalent radicals selected from hydrogen, an alkyl group having between one and five carbon atoms, and a halogen; and
up to about 85 percent of a nonplasticizing monoanhydride,
   (3) a solvent having a boiling point no greater than about 110° C. selected from a lower alkyl ketone having up to five carbon atoms, a lower alkyl carboxylic acid ester having up to five carbon atoms, a chlorinated hydrocarbon having up to two carbon atoms, an aromatic hydrocarbon having up to seven carbon atoms, and a mixture thereof, and
   (4) about 0.5 to about 5.0 parts of an anhydride accelerator per hundred parts of resin,
the steps comprising
   (a) mixing said epoxy resin, anhydride hardener, anhydride accelerator, and solvent, and
   (b) heating said mixture of epoxy resin, anhydride hardener, anhydride accelerator and solvent with stirring at the reflux temperature of said solvent and no higher than about 110° C. until solution is obtained.

2. A method for making a liquid epoxy resin-diaryl dianhydride impregnant in accordance with claim 1 in which th diaryl dianhydride is 3,4,3',4'-benzophenone tetracarboxylic dianhydride, and the solvent is acetone.

3. A method for making a liquid epoxy resin-diaryl dianhydride impregnant in accordance with claim 2 in which the epoxy resin is prepared by the reaction of epichlorohydrin with a dihydric phenol, the monoanhydride is maleic anhydride or a mixture of methylbicyclo (2.2.1)heptene-2,3-dicarboxylic anhydride isomers and the A/E ratio is between about 0.4 and about 1.0.

4. A method for making a liquid epoxy resin-diaryl dianhydride impregnant in accordance with claim 1 in which the diaryl dianhydride is 3,4,3',4'-benzophenone tetracarboxylic dianhydride and the solvent is methyl ethyl ketone.

* * * * *